UNITED STATES PATENT OFFICE.

ADRIAAN NAGELVOORT, OF PROVIDENCE, RHODE ISLAND, ASSIGNOR TO THE NITROGEN CORPORATION OF PROVIDENCE, RHODE ISLAND, A CORPORATION OF RHODE ISLAND.

METHOD OF PRODUCING SODIUM BICARBONATE AND HYDROGEN.

15,314. Specification of Reissued Letters Patent. Reissued Mar. 21, 1922.

No Drawing. Original No. 1,352,211, dated September 7, 1920, Serial No. 357,042, filed February 7, 1920. Application for reissue filed July 16, 1921. Serial No. 485,287.

*To all whom it may concern:*

Be it known that I, ADRIAAN NAGELVOORT, a citizen of the United States, residing at Providence, in the county of Providence and State of Rhode Island, have invented certain new and useful Improvements in Methods of Producing Sodium Bicarbonate and Hydrogen, of which the following is a specification.

This invention, in one of its aspects, relates to the ammonia soda process, and in another of its aspects, to the production of substantially pure or readily purifiable gas or gaseous mixtures, suitable for use in the synthesis of ammonia, from its elements.

In the ammonia soda process, for the production of sodium bicarbonate and carbonate of sodium, the following reaction is utilized:

$$(1)\quad NaCl+H_2O+NH_3+CO_2=NaHCO_3+NH_4Cl.$$

The $CO_2$ gas for producing the above reaction is obtained from the burning of limestone in special lime kilns; in which case the $CO_2$ gas is mixed with nitrogen,—the mixed gases having approximately the following analysis:

| | |
|---|---|
| $CO_2$ | 35% to 40% |
| $N_2$ | 65% to 60% |

The Solvay towers were designed for the use of a carbonating gas containing approximately 50% $CO_2$ and 50% $N_2$; and since their introduction by Solvay, they appear not to have been materially improved upon. In practice, a gas thus containing approximately 50% $CO_2$ and 50% $N_2$, has been found to be most suitable in the manufacture of bicarbonate of soda; because with such a mixture of gases, crystals of the bicarbonate salt have been found to form with ideal fineness, size, texture, etc.

I have discovered that hydrogen may be substituted for nitrogen as a dilutent of the carbon dioxid, without impairment to the process in any way; while on the other hand certain very important advantages are obtained by this substitution.

To begin with, this discovery enables me to entirely eliminate, if desired, the quite costly step of burning limestone to produce the $CO_2$ required for the ammonia soda process. One reason why this step is comparatively costly, is the great expense of installation and upkeep of the kilns in which the lime is burned; together, of course, with the cost of mining the stone.

A second great advantage resides in the fact that the operation set forth in equation (1), which has heretofore been conducted solely for the purpose of producing sodium bicarbonate; may, by effecting the herein described modification thereto, be caused to act in a dual capacity and yield not alone sodium bicarbonate, but also substantially pure hydrogen.

The foregoing may be accomplished, desirably, by using water gas as a source of the $CO_2$,—which becomes possible by virtue of my aforesaid discovery. Water gas may be considered as having approximately the following analysis:

$H_2$, 49%; CO, 40%; $CO_2$, 5%; $N_2$, 5%; $H_2S$, $\frac{1}{10}$%; and about $\frac{1}{2}$% of $CH_4$, or the like, etc.

To obtain hydrogen gas from such a gaseous mixture, it has heretofore been necessary to remove the other gases either by liquidation or absorption by suitable absorbers, with or without pressure.

By converting the CO in the water gas, into $CO_2$ and $H_2$ by means, for example, of some one of the known metal-oxid catalytic masses,—mixing steam with the water gas preparatory to effecting contact of the so formed gaseous mixture with the contact body,—it is possible to obtain a mixture of hydrogen and carbon dioxid, associated with varying amounts of carbon monoxid and nitrogen, and in some cases, with other impurities such as hydrogen sulfid; care being taken in the contact process, to avoid methane or like hydrocarbon formation during the steam treatment.

The percentage of CO in this mixture may be made quite small; the amount, of course, depending upon the nature of the catalyst and the temperature of the operation.

Such a small percentage of CO and other impurities, in the gases emerging from the contact chamber, will not be harmful in the manufacture of bicarbonate of sodium in ammonia soda process. Accordingly, I now cause the said mixture to pass up through a Solvay carbonating tower, in lieu of the usual mixture of carbon dioxid and nitrogen.

The $CO_2$ content of the gaseous mixture is separated by the sodium bicarbonate forming reaction and nearly pure hydrogen passes off at the top of the carbonating tower.

The remaining traces of CO in this exit gas may be eliminated by known treatment, such as by using cuprous chlorid solution as an absorbent for the CO.

As will be hereinafter pointed out, the sulfur bearing gaseous impurities may be automatically eliminated in the Solvay towers, and, hence, the gas obtained is substantially pure hydrogen containing more or less nitrogen, which is unobjectionable; since a mixture of three parts by volume of nitrogen, to one of hydrogen, must be provided for the ammonia synthesis operation.

I may enrich my mixture of hydrogen and carbon dioxid gases, obtained from the water gas, by adding thereto pure $CO_2$ from the calcining furnaces in which the bicarbonate of sodium is converted into sodium carbonate—in which operation $CO_2$ and $H_2O$ are produced; the $H_2O$ being separated from the $CO_2$ by suitable condensers, preferably before said carbon dioxid is thus added to the hydrogen-carbon-dioxid mixture.

I shall now consider the third great advantage of the present improvement in the ammonia soda process. In said process, as usually conducted, a small amount of sulfur is regularly introduced into the carbonating towers in the form of $H_2S$ or $(NH_4)_2S$, to form a coating of FeS on the interior walls of these carbonating towers, which are made of iron.

This prevents the corrosion of the iron walls, and keeps the precipitated bicarbonate free from iron rust, which, otherwise would color and spot and make unsalable the sodium bicarbonate.

In water gas there is always more or less $H_2S$ which, especially if present in any material amount, should be removed before the CO of the water gas can be efficiently converted into $CO_2$ by the catalyst or catalysts used as contact bodies to effect the reaction:

$$(2) \quad CO+H_2O=CO_2+H_2.$$

In order to prolong the life of the $CO_2$ and $H_2$ forming catalyst, I have found it of advantage to first pass the water gas directly through one or more Solvay carbonating towers to eliminate the hydrogen sulfid and the $CO_2$ incident to the production of the water gas—before passing the exit gases through the contact apparatus for conversion of the CO into $CO_2$.

The $H_2S$ content of the water gas is just about enough to keep the carbonating towers coated with FeS, for the step of the operation in which the $CO_2$ is utilized in the formation of sodium bicarbonate. When said $H_2S$ content is insufficient for this purpose, a small quantity of $H_2S$ can be added directly to the water gas. In general, the amount of sulfur initially present in the water gas depends, of course, upon the fuel used for making said gas.

The preferred mode of conducting the entire operation is hence briefly as follows:

I bubble the water gas coming from the generators, up through ammonia brine solution in one or more carbonating towers of an ammonia soda process plant,—to remove sulfur compounds together with any $CO_2$ present in said gas,—then take the gases from said tower or towers, which are now substantially CO and $H_2$, and add steam preparatory to passing the mixture, at an elevated temperature, over a heated catalyst, to convert all CO into $CO_2$ by the reaction expressed by equation (2). Finally, I pass the preferably so produced mixture of $CO_2$ and $H_2$, through the ammonia brine solution in a second carbonating tower, or series of towers, for the precipitation of sodium bicarbonate and simultaneous purification of hydrogen gas for use in the synthesis of ammonia, the hydrogen content of the mixture passed through this second tower, preferably being present in sufficient quantity to properly dilute the carbon dioxid of said mixture, to prevent undue development of heat and afford a yield of large sodium bicarbonate crystals.

The hydrogen remaining after the removal of the carbon dioxid may then be mixed with nitrogen in proper proportions and passed into contact with a catalyst under suitable conditions of temperature and pressure for the formation of ammonia, thus utilizing the hydrogen gas thus freed from the carbon dioxid in the production of ammonia and utilizing the reaction with ammoniated brine for the double purpose of forming sodium bicarbonate and effecting a preliminary purification of the hydrogen gas to adapt the same for use in the synthesis of ammonia.

By using each carbonating tower of an ammonia soda plant in turn, for the removal of sulfur compounds from water gas, I keep the interior of my towers coated with FeS.

Having thus described my invention, what I claim is:

1. The improvement in the effectuation of the ammonia soda process which comprises reacting upon ammoniated brine with carbon dioxid diluted with hydrogen to prevent undue development of heat and favor the formation of relatively large crystals of sodium bicarbonate, while simultaneously separating said carbon dioxid from said hydrogen, and collecting said hydrogen preparatory to using the same in an ammonia synthesizing operation.

2. The improvement in the effectuation of the ammonia soda process which comprises reacting upon ammoniated brine with carbon dioxid diluted with hydrogen and which mixture of carbon dioxid and hydrogen is substantially free from carbon monoxid, to simultaneously produce sodium bicarbonate and hydrogen substantially free from gaseous impurities other than nitrogen.

3. The process of producing sodium bicarbonate and hydrogen, which comprises treating a gaseous mixture containing carbon monoxid, carbon dioxid, hydrogen and hydrogen sulfid, to free said mixture from said dioxid and sulfid, by bubbling it through ammoniated brine in a receptacle the walls of which are of iron, treating the exit gases to convert said carbon monoxid into carbon dioxid, and bubbling the gaseous residues through ammoniated brine to produce sodium bicarbonate and hydrogen.

4. The improvement in the effectuation of the ammonia soda process which comprises treating carbonaceous matter, at an elevated temperature, with steam, to form carbon dioxid and hydrogen, and separating said hydrogen from said carbon dioxid through the intermediacy of ammoniated brine.

5. The improvement in the effectuation of the ammonia soda process, as conducted in carbonating towers the walls of which are of iron, which comprises converting the surfaces of said walls into iron sulfid, to provide coatings of said sulfid upon said walls, by passing through said towers the gaseous reaction products resulting from the conversion of sulfur bearing fuel and steam, into hydrogen, hydrogen sulfid, carbon monoxid and carbon dioxid, treating the gases emerging from said tower to convert said carbon monoxid into carbon dioxid, and separating said carbon dioxid from said hydrogen by reacting upon said dioxid with ammoniated brine in a carbonating tower the walls of which are coated with iron sulfid to prevent discoloration of the sodium bicarbonate crystals formed by said last mentioned reaction.

6. The improvement in the effectuation of the ammonia soda process, as conducted in carbonating towers the walls of which are of iron, which comprises converting the surfaces of said walls into iron sulfid, to provide coatings of said sulfid upon said walls, by passing through said towers the gaseous reaction products resulting from the conversion of sulfur bearing fuel and steam, into hydrogen, hydrogen sulfid, carbon monoxid and carbon dioxid.

7. The process of producing sodium bicarbonate and synthetic ammonia by interrelated operations which comprises the formation of a gaseous mixture and the utilization of said mixture to effect the first of said operations and at the same time eliminate from said mixture gases which are adapted to injuriously affect the second operation.

8. The process of producing sodium bicarbonate and ammonia which comprises the formation of a gaseous mixture including carbon dioxid and an ammonia forming gas, utilizing said mixture in the production of sodium bicarbonate whereby said ammonia forming gas serves as a dilutent for the carbon dioxid, and recovering the ammonia forming gas thus freed from carbon dioxid.

9. The process of obtaining pure or substantially pure hydrogen by reacting upon ammoniated brine with a mixture of carbon dioxid and hydrogen.

In testimony whereof I have affixed my signature.

ADRIAAN NAGELVOORT.